(12) United States Patent
Lintunen et al.

(10) Patent No.: US 7,637,793 B2
(45) Date of Patent: Dec. 29, 2009

(54) SPARK PLUG AND METHOD FOR PRODUCING IT

(75) Inventors: Pertti Lintunen, Tampere (FI); Pekka Lintula, Tampere (FI); Tomi Lindroos, Lempäälä (FI); Aulis Silvonen, Vaasa (FI); Kalevi Taskinen, Pirkkala (FI)

(73) Assignee: Wärtsilä Finland Oy, Vaasa (FI)

( * ) Notice: Subject to any disclaimer, the term of this patent is extended or adjusted under 35 U.S.C. 154(b) by 455 days.

(21) Appl. No.: 10/549,383

(22) PCT Filed: Mar. 10, 2004

(86) PCT No.: PCT/FI2004/050025

§ 371 (c)(1),
(2), (4) Date: Sep. 15, 2005

(87) PCT Pub. No.: WO2004/084367

PCT Pub. Date: Sep. 30, 2004

(65) Prior Publication Data

US 2006/0103283 A1  May 18, 2006

(30) Foreign Application Priority Data

Mar. 18, 2003  (FI) .................................. 20030401

(51) Int. Cl.
*H01T 13/20* (2006.01)
(52) U.S. Cl. .......................................... 445/7
(58) Field of Classification Search ................ 313/141, 313/118, 143; 123/143, 169 R; 445/7; 219/121.64
See application file for complete search history.

(56) References Cited

U.S. PATENT DOCUMENTS

| | | | | |
|---|---|---|---|---|
| 2,391,455 A | * | 12/1945 | Hensel | ........................ 313/142 |
| 5,107,168 A | | 4/1992 | Friedrich et al. | |
| 5,323,955 A | | 6/1994 | Bergmann et al. | |
| 5,369,328 A | * | 11/1994 | Gruber et al. | ................ 313/141 |
| 5,395,273 A | * | 3/1995 | Matsutani | ........................ 445/7 |
| 2002/0055318 A1 | * | 5/2002 | Ishiguro et al. | ................. 445/7 |

FOREIGN PATENT DOCUMENTS

| | | |
|---|---|---|
| EP | 0 817 342 | 1/1998 |
| EP | 0 903 824 | 3/1999 |
| EP | 1 111 746 | 6/2001 |
| EP | 1 286 442 | 2/2003 |
| GB | 1 047 513 | 11/1966 |
| WO | 97/49153 | 12/1997 |
| WO | 01/95447 | 12/2001 |

* cited by examiner

*Primary Examiner*—Joseph L Williams
*Assistant Examiner*—Elmito Breval
(74) *Attorney, Agent, or Firm*—Chernoff, Vilhauer, McClung & Stenzel, LLP

(57) ABSTRACT

A spark plug for an internal combustion engine, the spark plug having at least two electrodes, in which the electrodes are formed of a first part made of a substrate material and a surface part more durable than the substrate material. The surface part of the spark plug is joined to the first part via an intermediate part making use of explosion welding. The method also relates to a method for producing a spark plug for an internal combustion engine, the spark plug having at least two electrodes.

4 Claims, 2 Drawing Sheets

SPARK PLUG AND METHOD FOR PRODUCING IT

Figure 1:
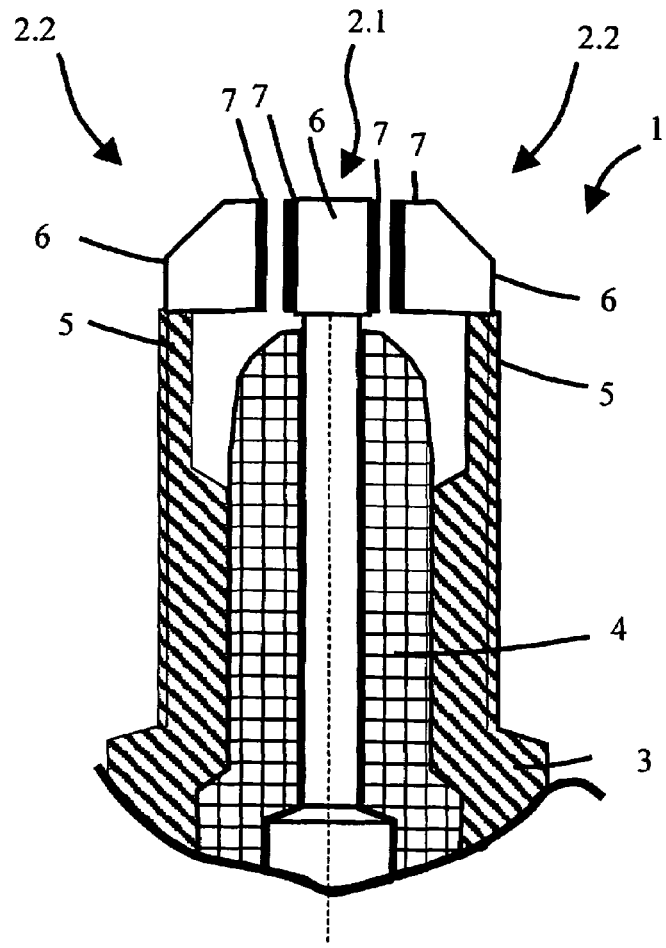

This is a national stage application filed under 35 USC 371 based on International Application No. PCT/FI2004/050025 Filed Mar. 10, 2004, and claims priority under 35 USC 119 of Finnish Patent Application No. 20030401 filed Mar. 18, 2003.

The present invention relates to a spark plug comprising at least two electrodes, the electrodes being formed by first part made of a substrate material, and a surface part, more durable than the substrate material. The present invention also relates to a method for producing a spark plug for an internal combustion engine, the spark plug having at least two electrodes.

Spark plugs are generally used in e.g. internal combustion engines for igniting the mixture of fuel and air/oxygen in the combustion chamber. This is accomplished by introducing a relatively high voltage difference between the electrodes of the spark plug, whereby a spark igniting the mixture is formed.

Currently, the development of the spark plugs of internal combustion engines is more and more based on utilizing metals and metal alloys of the Pt group (Pt, Pd, Ir, Rh, Ru, Os) having a high melting point and good resistance to oxidation erosion and spark erosion. This development has been more pronounced especially with the increased service life and reliability requirements of the gas engines having pre-chambers. For example, the publications U.S. Pat. No. 6,078,129 and JP 11-003765 disclose the use of an iridium alloy belonging to the Pt group.

It has been estimated that during ignition the surface temperature of the electrodes is in the range of 2000-3000° C., so a good resistance to, for example, oxidation is required of the material. The large changes of temperature also require a high resistance against, for example, the thermal fatigue of the joints. In publication U.S. Pat. No. 6,078,129, a part made of iridium alloy has been fastened to the centre electrode of the spark plug by means of laser welding. Melt welding, however, produces a joint surface that is not optimal for this application. A melting zone is produced in the method, requiring a larger material thickness of the joined part. Further, brittle areas can be formed in the interface surface and it can become relatively inhomogeneous.

The electrode materials must also have a good resistance to corrosion. Resistance to corrosion and oxidation together enhance improvement of wear resistance, as wear usually occurs through spark erosion and/or oxidation wear. It is known that the service life of metals having a high melting point and belonging to the Pt group, such as iridium and platinum and their alloys, in such applications is usually sufficiently long. Especially iridium and its alloys with, for example, rhodium or rhenium, has considerably enhanced the increase of the service life of spark plugs. Rh and Re mainly increase the oxidation resistance of iridium. The construction and method of production of a spark plug is not, however, currently very preferable.

The present invention relates to a spark plug for an internal combustion engine minimizing the problems of prior art. The invention especially relates to a spark plug for an internal combustion engine achieving a long service life. The invention also relates to a method of producing a spark plug for an internal combustion engine, by means of which the design of the spark plug is durable and the production process is inexpensive.

In a spark plug for an internal combustion engine having at least two electrodes the electrodes are formed of a first part, made of a substrate material, and a surface part, more durable than the substrate material. A characterizing feature of such a spark plug is that the surface part is joined to the first part by means of an intermediate part and that the joint between the surface part and the intermediate part is an explosion weld joint. Thus, the depletion of the surface part into the substrate material can be minimized. Correspondingly, the joint between the substrate material and the intermediate part is preferably a conventional melt metal joint. This in turn allows the joining of the electrode to the surrounding construction, such as the body of the spark plug, to be carried out more easily and reliably than in prior art. The substrate material acting as the first part can be a part of the spark plug body, especially in the case of a ground electrode.

In an electrode according to the invention, the surface part is preferably formed of one or more of the metals of the Pt group (Pt, Pd, Ir, Rh, Ru, Os) or an alloy thereof. The joint between the surface part and the intermediate part is preferably homogenous on the area of the whole joint surface, whereby it is also strong.

Preferably, in an electrode according to the invention the thickness of material of the surface part perpendicular to the surface of the joint between the surface of the electrode and the intermediate part is 0.05-2 mm.

According to the invention, the method for producing a spark plug having at least two electrodes, in which spark plug the electrodes are produced from a first part, made of the substrate material of the spark plug, and a second part, made of a material more durable than the first material, comprises the following combination of production stages, in which
- a blank is formed, comprising a surface part and an intermediate part, by joining the surface part to the intermediate part by means of explosion welding,
- a part with a suitable form is separated from the blank to form the electrode of the spark plug, and
- the part separated from the blank is fastened to the first part of the spark plug so that the joint is made between the said first part and the intermediate part.

According to one embodiment the surface portion of the blank is preferably formed of a planar piece consisting of one or more metals of the Pt group or an alloy thereof, the piece being explosion welded to the equally planar intermediate part.

According to another embodiment the surface portion of the blank is preferably formed of a powder consisting of one or more metals of the Pt group or an alloy thereof, the powder being simultaneously solidified and joined to the intermediate part by means of explosion welding.

The invention accomplishes a number of advantages which are disclosed in, for example, the following description of drawings. A factor having an especial effect on the good quality of the final product is that the used joining method does not affect the microstructure, integrity or geometry of the actual electrode surface, because the intermediate part allows the surface of the joint to the substrate material to be far enough from the surface part.

Figure 2:
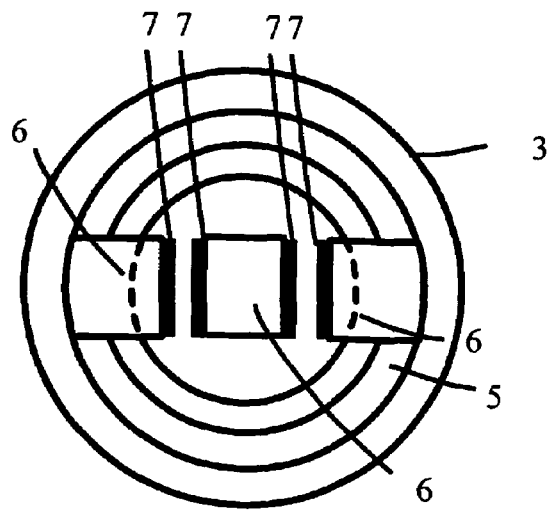
Figure 3:
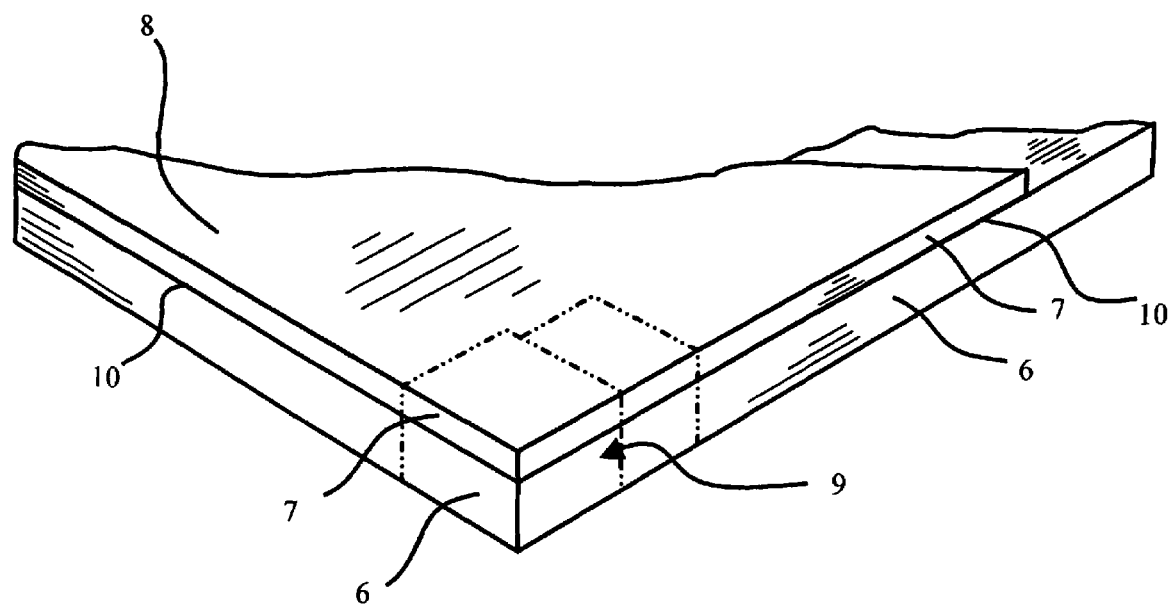

In the following the invention is described by way of example and with reference to the appended drawings, of which FIG. 1 is a schematical representation of a spark plug according to the invention, FIG. 2 is a spark plug of FIG. 1 seen from above, and FIG. 3 shows the principle of the method according to the invention.

The spark plug 1 shown in FIGS. 1 and 2 comprises three electrodes 2.1, 2.2 of which two are so-called ground electrodes 2.2 and one a so-called center electrode 2.1. The operation of the spark plug is known as such and is not described here as not belonging to the invention. In the spark plug the center electrode 2.1 is supported to the body 3 of the spark plug by means of a separate insulation 4. According to the invention the spark plug consists of a first part 5 made of a substrate material, the first part possibly being a part of the body 3 of the spark plug. Further, the electrode consists of a surface part 7, more durable than the substrate material, the surface part being joined to the first part of the spark plug via an intermediate part 6 which is also a part of an electrode 2.1, 2.2. In the invention, the surface part 7, which preferably is a metal or metal alloy of the Pt group, is joined as a thin film first to the more conventional and easier material, such as a heat-resistant steel or a super alloy, such as an Ni-based super alloy. With the reference to schematic FIG. 3, according to the invention the joining technology is such that the joint surface 10 is essentially homogenous. Preferably the joining method is explosion welding. The spark plug body as such, is manufactured in conventional manner, made of substrate material. According to the invention a planar blank 8 is formed by joining the surface part 7 to the intermediate part 6 making use of explosion welding. The blank may be e.g. a considerably big plate, from which a part 9 having a suitable form is separated. The part 9 consists of the surface part 7 and intermediate part 6. The part 9 is fastened to the spark plug body i.e. the first part 5 so that the joint is made between the first part 5 and the intermediate part 6.

Explosion welding produces a lot of advantages for the production of the electrode and for properties during use.

- There is no melt zone within the joint, whereby the depletion of the expensive metal of the Pt group into the substrate can be minimized, whereby also the said metal film can be thin.
- Because of the above considerable cost savings can be achieved.
- There are no brittle phases formed in the transformation zone near the interface surface between the Pt group metal film and the substrate material
- The possibility of getting a very strong, slightly wavy joint surface.
- Solid, homogenous and smooth joint surface, no separate beads.
- The use of melt welding, causing the above-mentioned problems, can be avoided.

It is possible to use explosion welding for producing a two- or multi-layer plate, i.e. blank 8, from which parts 9 of suitable size or ready electrodes are separated, for example by means of laser cutting, water jet cutting or spark machining, to be further attached to the spark plug 1. These are attached to form, for example, a ground electrode to the first part 5 of the electrode 2.1, 2.2 in connection with the body 3 of the spark plug.

The attaching can be accomplished by using conventional means, such as laser welding, electron welding or friction welding. Soldering can also be used as an attachment means.

Typically, hundreds of electrodes can be produced from an explosion welded blank 8. Usually, the explosion welded surface does not need post-machining or grinding. Further, any heat treatment of the electrode blanks can be easily and inexpensively accomplished as the pieces are separate and compact in size. The gap is adjusted as necessary when the electrodes are fastened.

The invention is not limited to the embodiments described here, but a number of modifications thereof can be conceived of within the scope of the appended claims.

We claim:

1. A method for producing a spark plug having at least two electrodes, in which the electrodes each include at least a base part, made of a substrate material of the spark plug, and a surface part, made of a material more durable than the substrate material, comprising the following steps:

forming a blank comprising a surface part and an intermediate part, by joining the surface part to the intermediate part by means of explosion welding, separating a part with a suitable form from the blank to form the electrode of the spark plug, wherein the part that is separated from the blank includes both a portion of the surface part and a portion of the intermediate part, and fastening the part separated from the blank to the base part of the spark plug so that a joint is made between said base part and said portion of the intermediate part.

2. A method according to claim 1, wherein the intermediate part of the blank is planar and the surface part of the blank is planar and consists of at least one metal of the Pt group or an alloy thereof.

3. A method according to claim 2, wherein the surface part of the blank is formed of powder consisting of at least one metal of the Pt group or an alloy thereof, the powder being simultaneously solidified and joined to the intermediate part by means of explosion welding.

4. A method for producing a spark plug having a center electrode and a ground electrode in which the electrodes each include at least a base part, made of a substrate material of the spark plug, and a surface part, made of a material more durable than the substrate material, comprising the following steps:

forming a composite blank comprising a surface part and an intermediate part, by joining the surface part to the intermediate part by means of explosion welding, separating a first composite member with a suitable form from the blank to form the ground electrode of the spark plug, wherein the part that is separated from the blank includes both a portion of the surface part and a portion of the intermediate part, fastening the first composite member to the base part of the ground electrode so that a joint is made between said base part of the ground electrode and said portion of the intermediate part of the first composite member, providing a second composite member that comprises a second surface part made of a material more durable than the substrate material of the base part of the center electrode and also comprises an intermediate part to which the second surface part is joined by explosion welding, and fastening the second composite member to the base part of the center electrode so that a joint is made between said base part of the center electrode and the intermediate part of the second composite member and the surface part of the first composite member is in spaced confronting relationship with the surface part of the second composite member.

* * * * *